United States Patent [19]

Marcy

[11] 4,049,961
[45] Sept. 20, 1977

[54] AUTOMATIC GUIDANCE SYSTEM FOR MOVING OBJECTS

[75] Inventor: Raymond Marcy, Paris, France

[73] Assignee: Thomson-CSF, Paris, France

[21] Appl. No.: 545,749

[22] Filed: Jan. 30, 1975

[30] Foreign Application Priority Data

Feb. 1, 1974 France .............................. 74.03470

[51] Int. Cl.² ............................................. G05B 1/00
[52] U.S. Cl. ...................................... 250/202; 180/98
[58] Field of Search ............... 250/202, 222, 578, 216, 250/215; 180/79.1, 98

[56] References Cited

U.S. PATENT DOCUMENTS

| | | | |
|---|---|---|---|
| 2,074,251 | 3/1937 | Braun | 250/215 X |
| 3,000,256 | 9/1961 | Hyde | 250/202 X |
| 3,320,424 | 5/1967 | Olson et al. | 250/216 X |
| 3,708,668 | 1/1973 | Tilley | 180/98 X |
| 3,739,179 | 6/1973 | Krekow | 250/202 |
| 3,744,586 | 7/1973 | Leinauer | 180/79.1 |

Primary Examiner—Alfred E. Smith
Assistant Examiner—David K. Moore
Attorney, Agent, or Firm—Karl F. Ross

[57] ABSTRACT

An automatic system for guiding moving objects is described which cooperates with passive responders situated on or along the road on which the system operates. The part of the system which is located aboard a vehicle comprises one or two optical transmitter/receiver units. The transmitter, comprising an emitter diode or two such diodes energized either continuously or alternately, emits a light signal in the form of a beam of radiation of limited dimensions covering a certain number of responders, which reflect a fraction of the light reaching them. The received signals make it possible to form an electrical signal whose amplitude and sign are a function of the position of the transmitter along an axis transverse to a longitudinal reference axis. This system is applicable to the automatic guidance of moving objects such as road vehicles along routes marked by responders.

13 Claims, 11 Drawing Figures

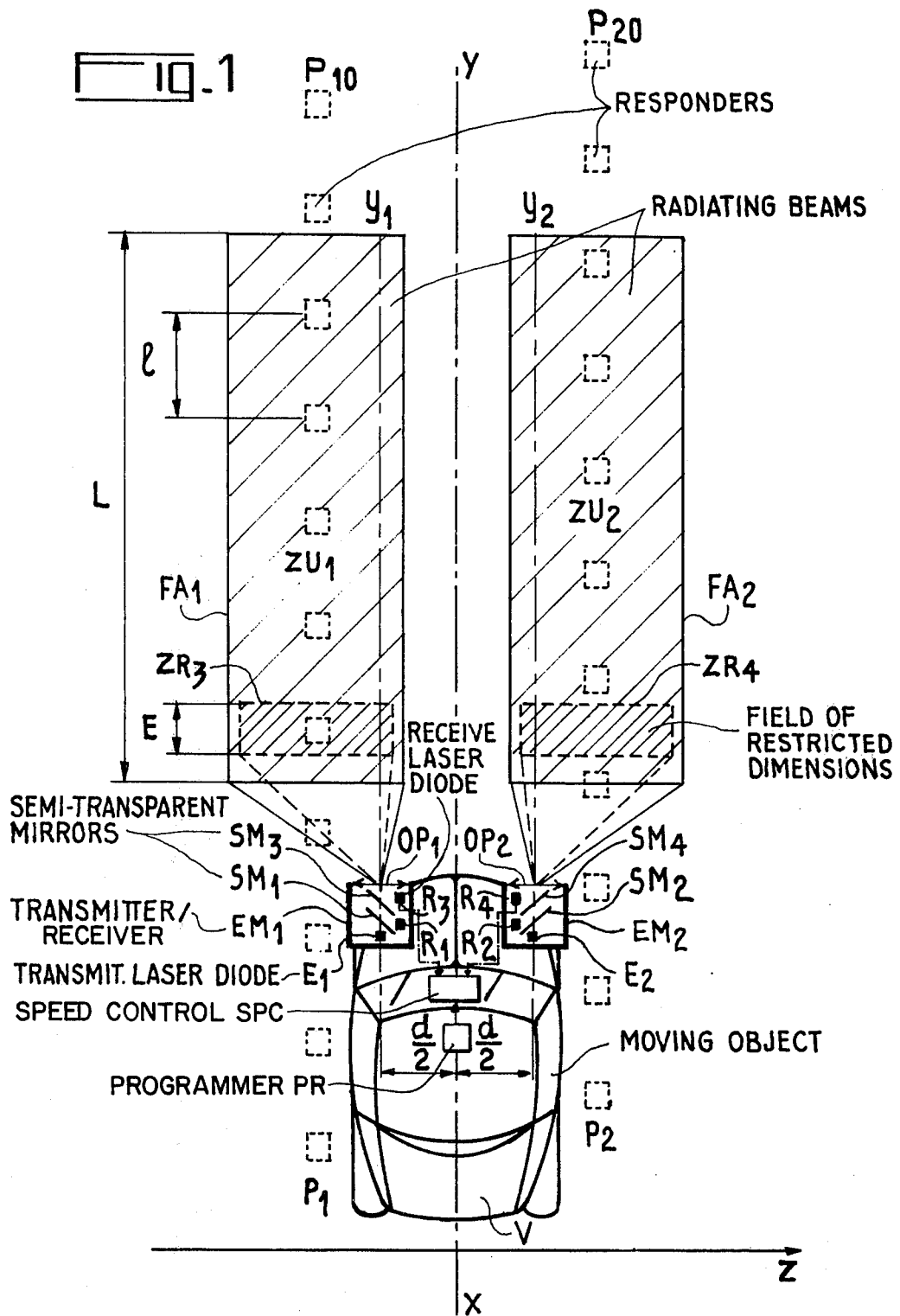

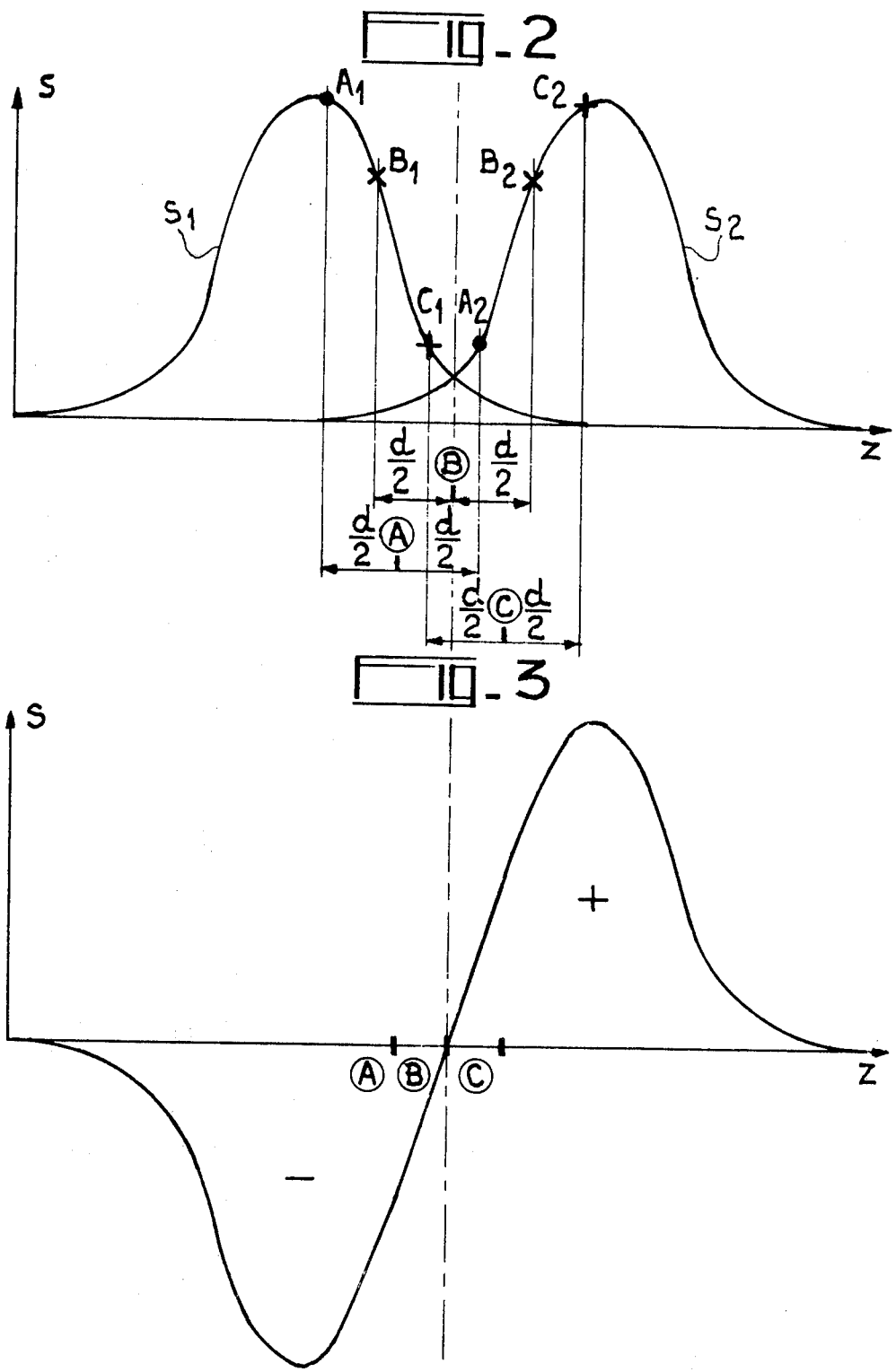

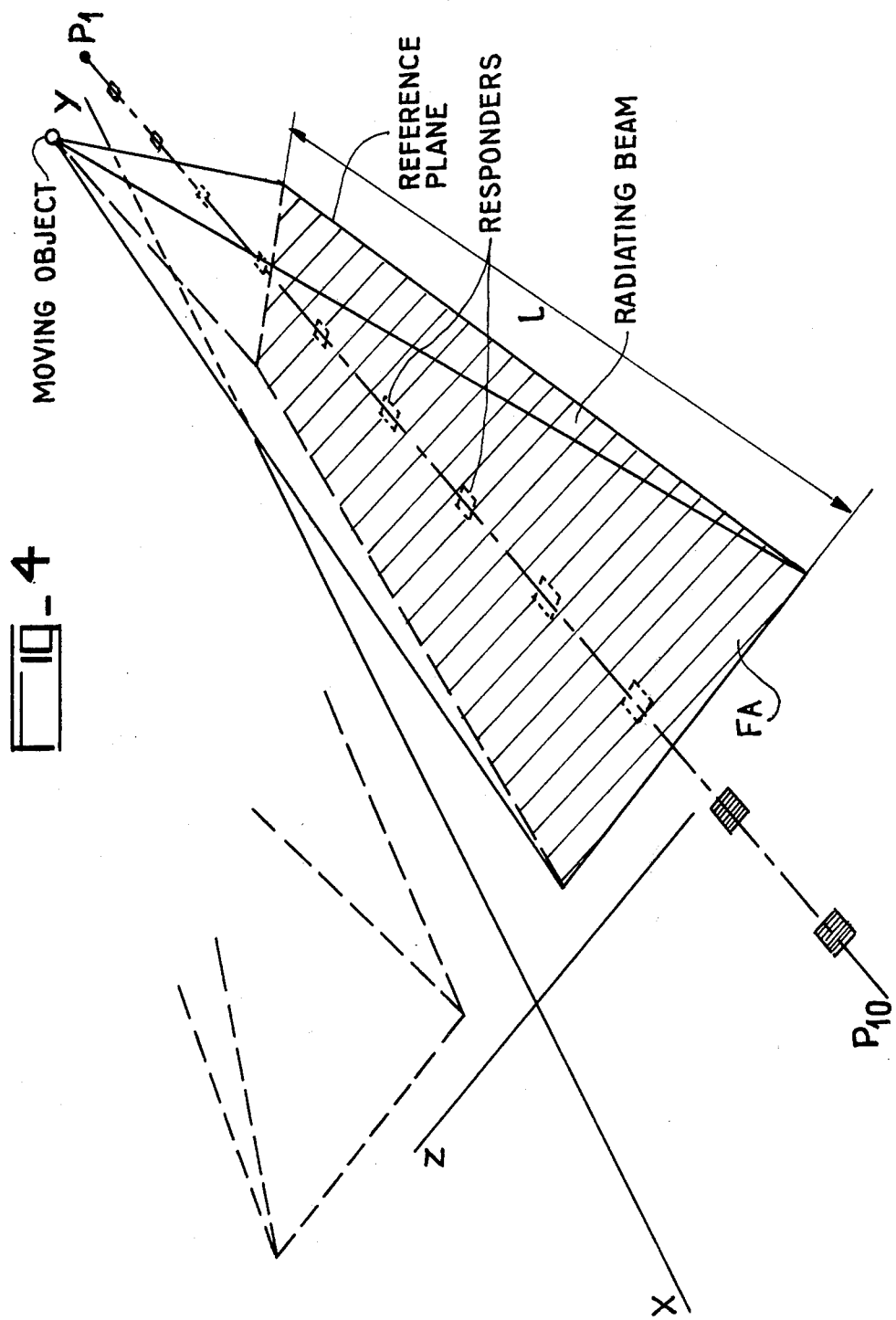

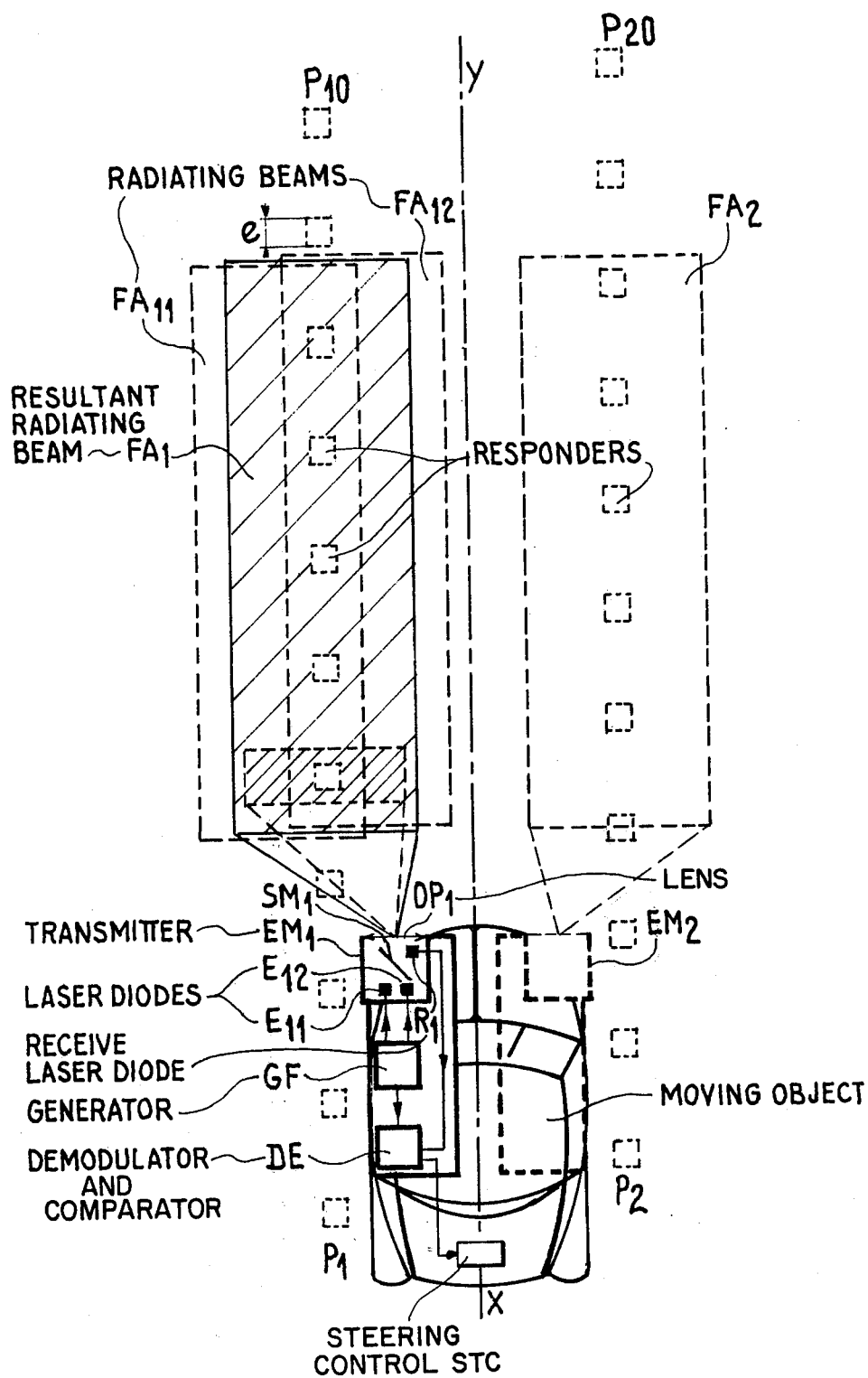

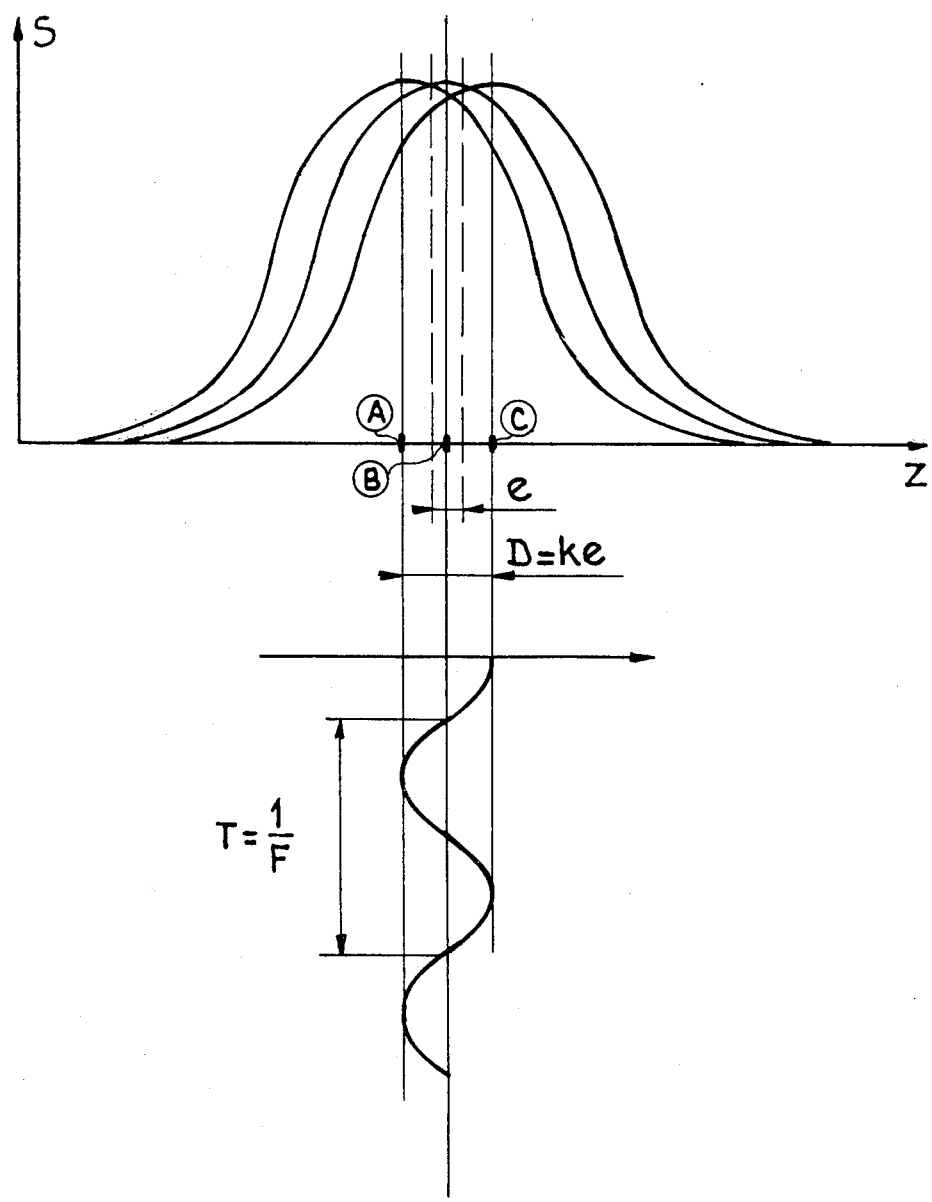

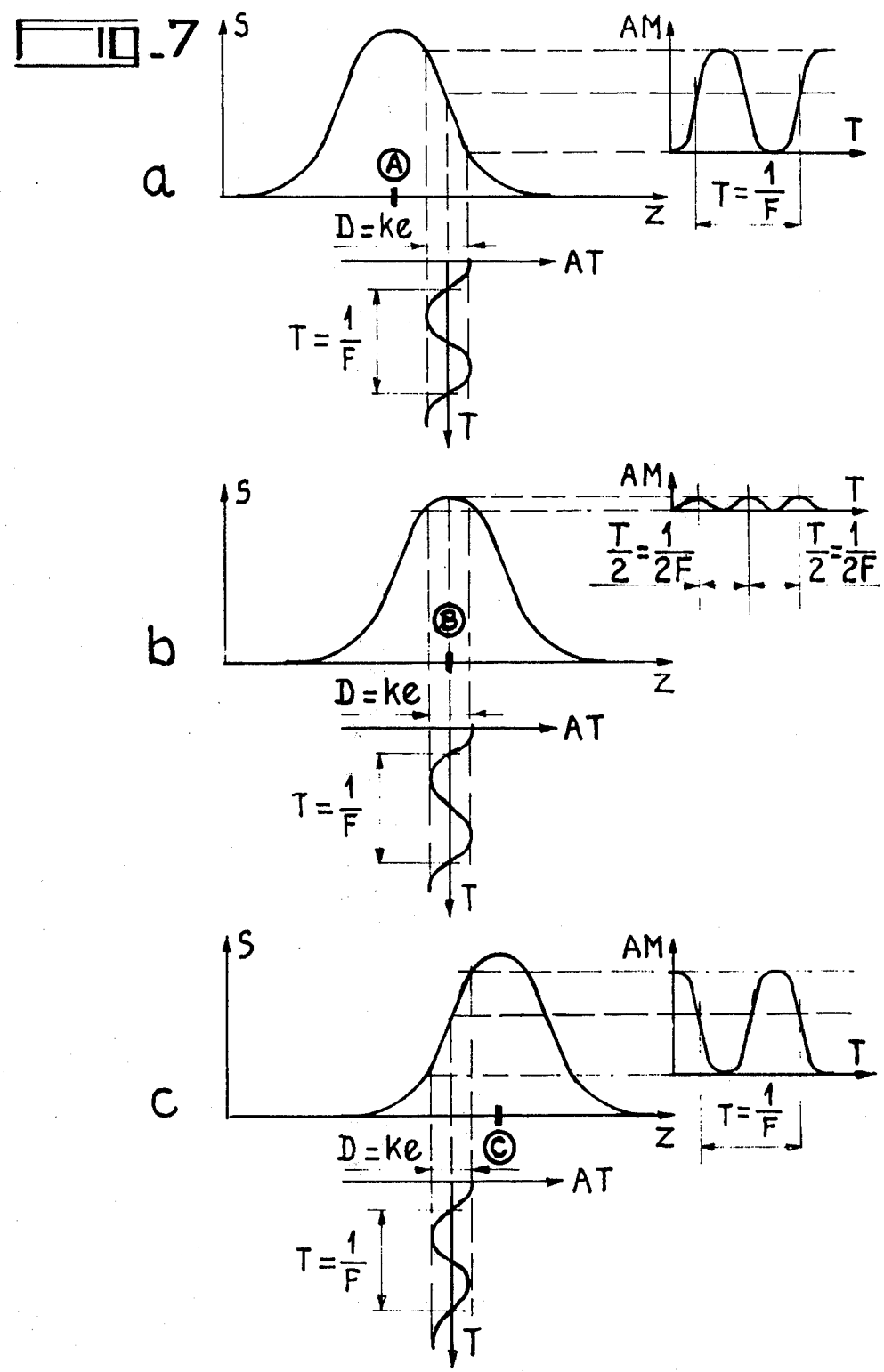

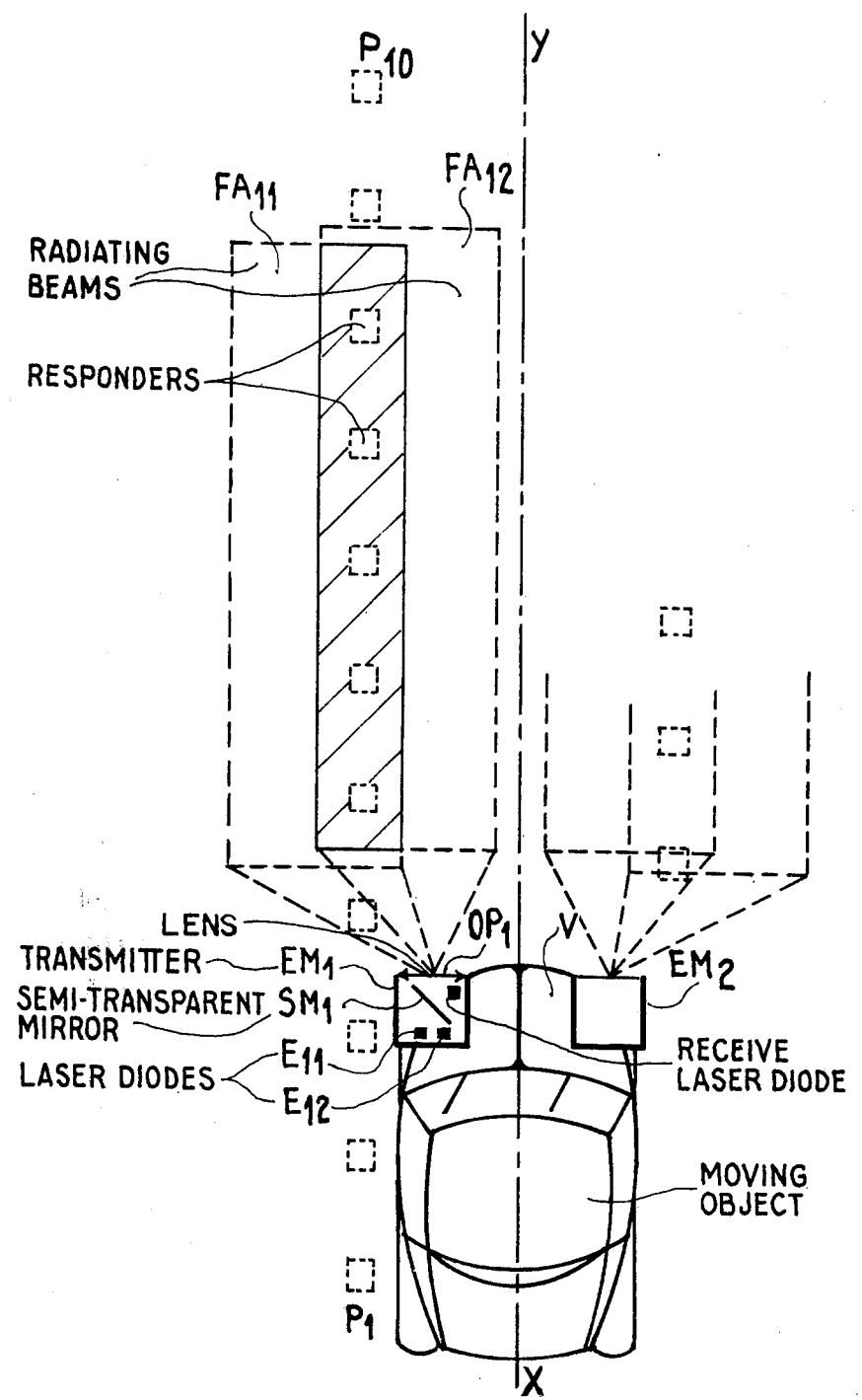

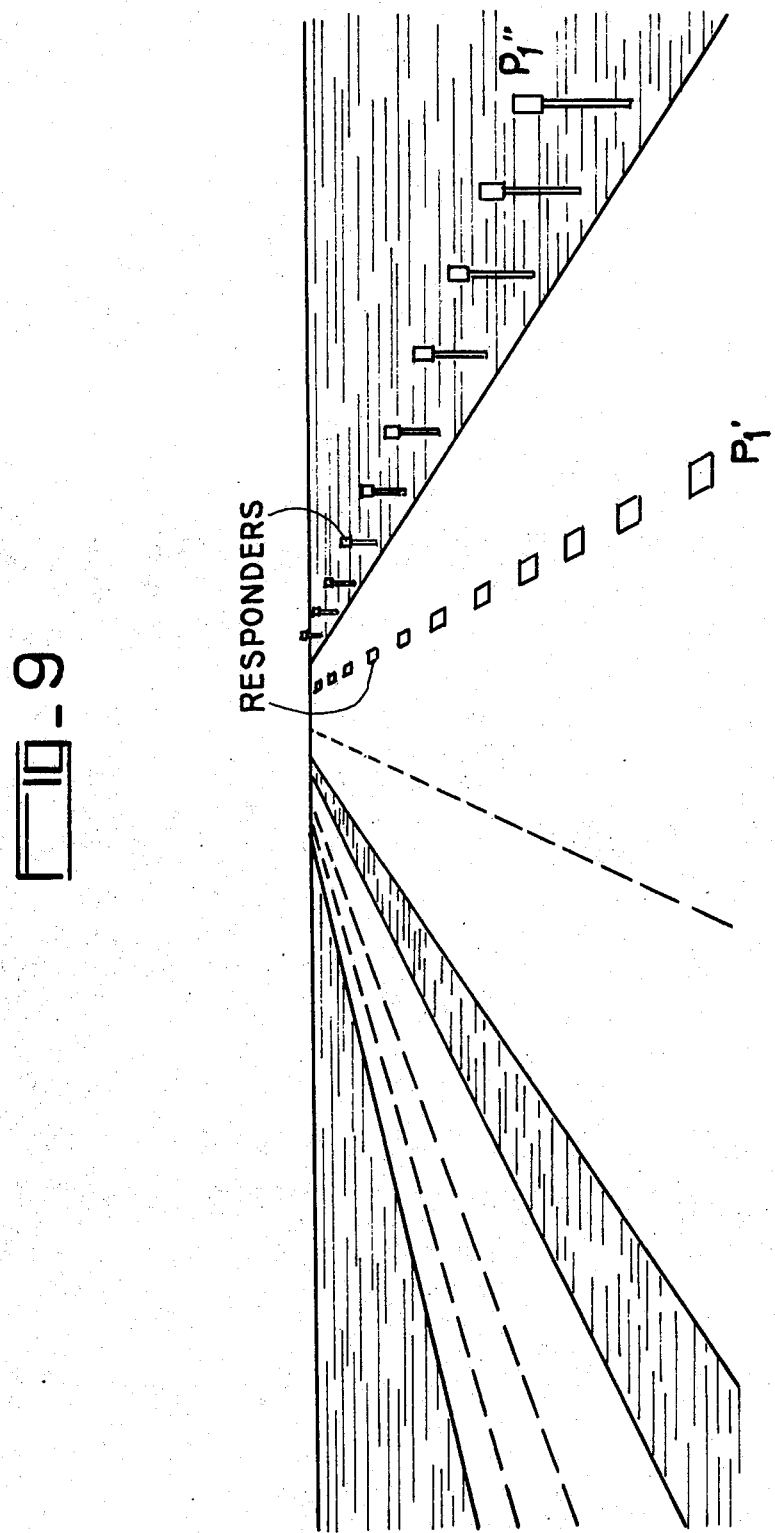

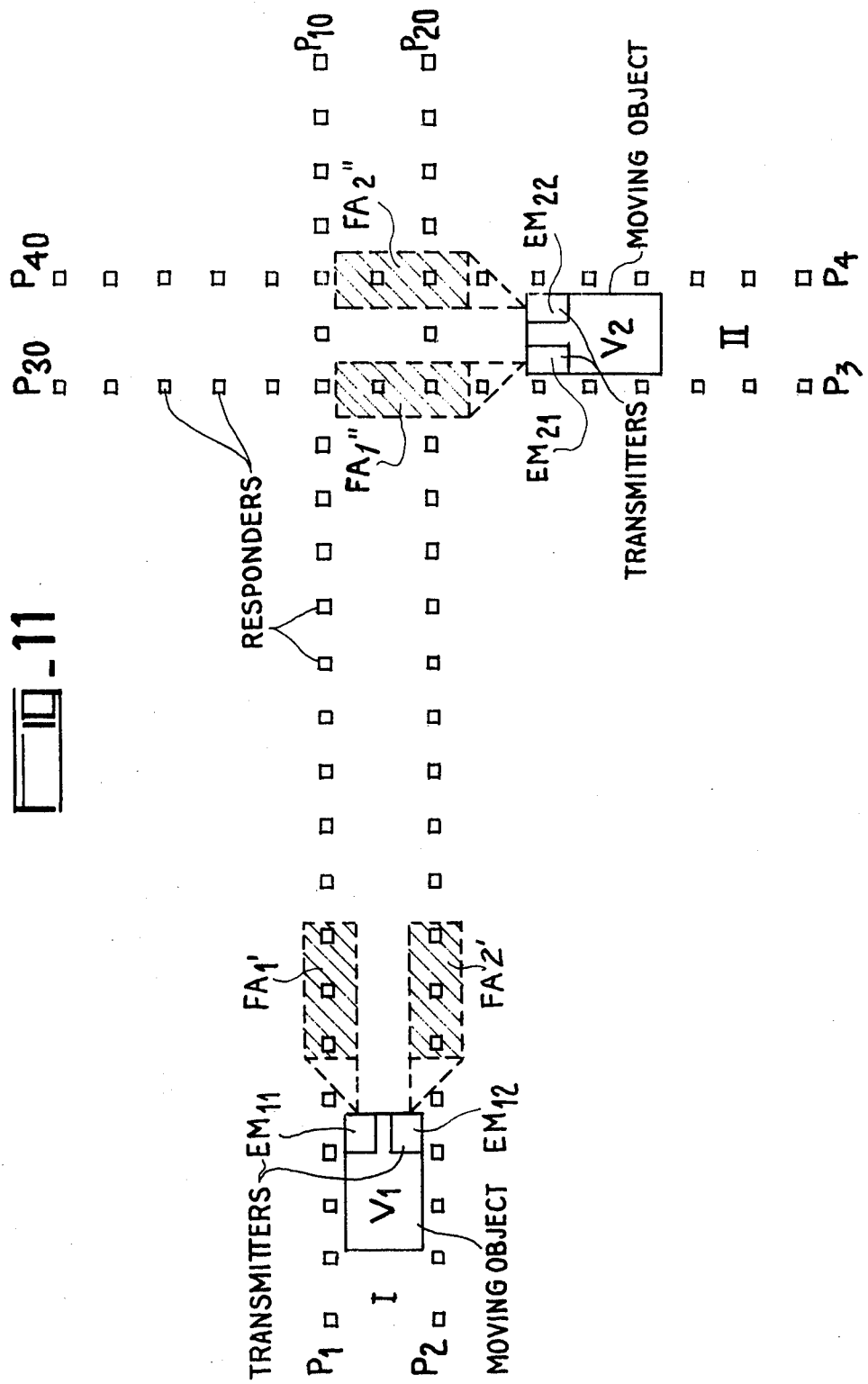

AUTOMATIC GUIDANCE SYSTEM FOR MOVING OBJECTS

The present invention relates to an automatic guidance system for moving objects. By "moving objects" I mean in particular vehicles moving along roads, in which case the system according to my invention has a mobile part installed aboard vehicles designed to be controlled by the system and another, fixed part associated with the route along which the guidance system operates.

Within the very wide context of the measures which need to be taken to supervise the ever-increasing car and truck traffic on roads and motorways and to regulate its flow so as to minimize delays, the need for an automatic guidance system for vehicles (particularly road vehicles in the case under discussion) has finally had to be recognized. Furthermore it has become apparent that driving vehicles by an automatic method could have advantages over manual driving, at least in certain cases and on particular routes where the conditions under which manual driving takes place are particularly trying.

Certain automatic guidance systems have already been tried which rely in principle on generating a magnetic field along the route in order to allow the center of the roadway in question to be defined with reasonable accuracy, and which include sensors mounted on the vehicles designed to determine the deviations between the line followed by the vehicle and this centerline, these deviations then acting in the desired direction on the steering mechanism.

However, there are certain difficulties in generating a magnetic field which remains of a certain strength throughout the possibly considerable length of a route, such as setting it up, maintaining it, and supplying energy to the cables, as well as the problem of disturbances in the receiver due to interference fields.

An automatic guidance system according to my invention comprises, on a vehicle or other object traveling over a supporting surface (e.g. ground) along a predetermined path, transmitting means such as a pair of laser diodes directing radiant energy forwardly and sideways toward that surface in the form of at least one pair of beams intersecting the supporting surface in two substantially rectangular zones of illumination having substantially coextensive major dimensions (length) in the direction of object motion, these zones being relatively offset transversely to the direction of motion and lying alongside a centerline of the path of travel which will be referred to hereinafter as a lane or a roadway. A series of spaced-apart responders are disposed in a single row parallel to the centerline, or in a pair of rows on opposite sides of that centerline, close to the supporting surface for reflecting radiant energy of substantially equal intensity from both beams toward the object as long as the latter occupies a normal position athwart the centerline, these zones having a width exceeding that of the row of responders and a length extending over a plurality of responders arrayed in a row. The object further carries receiving means, also advantageously in the form of one or more laser diodes, for separately detecting the reflections of the beams from the responders, the receiving means being connected to steering-control means on the object for correcting deviations thereof from the centerline of the path with the aid of comparison means designed to ascertain differences indicative of the deviations between the intensities of the detected reflections.

The above and other features of my invention will be readily apparent from the following description given in conjunction with the accompanying drawing in which:

FIG. 1 is a schematic representation of one form of the system according to the invention;

FIG. 2 shows waveforms illustrating the way in which the system of FIG. 1 operates;

FIG. 3 represents signals showing deviations of the position of the vehicle from a reference axis;

FIG. 4 is a diagram of the radiation emitted by the system;

FIG. 5 is another embodiment of the system;

FIG. 6 represents waveforms showing the signals obtained with the embodiment in FIG. 5;

FIG. 7 represents waveforms showing the modulated signals in the system of FIG. 5 for three positions of the vehicle along a transverse axis;

FIG. 8 is another view of a system embodying my invention;

FIG. 9 is a view of an arrangement of responders co-operating with a system according to the invention;

FIG. 11 is a diagram of an intersection as envisaged in connection with a system according to my invention.

FIG. 1 shows an embodiment of the system according to the invention in schematic form.

Figure 10:
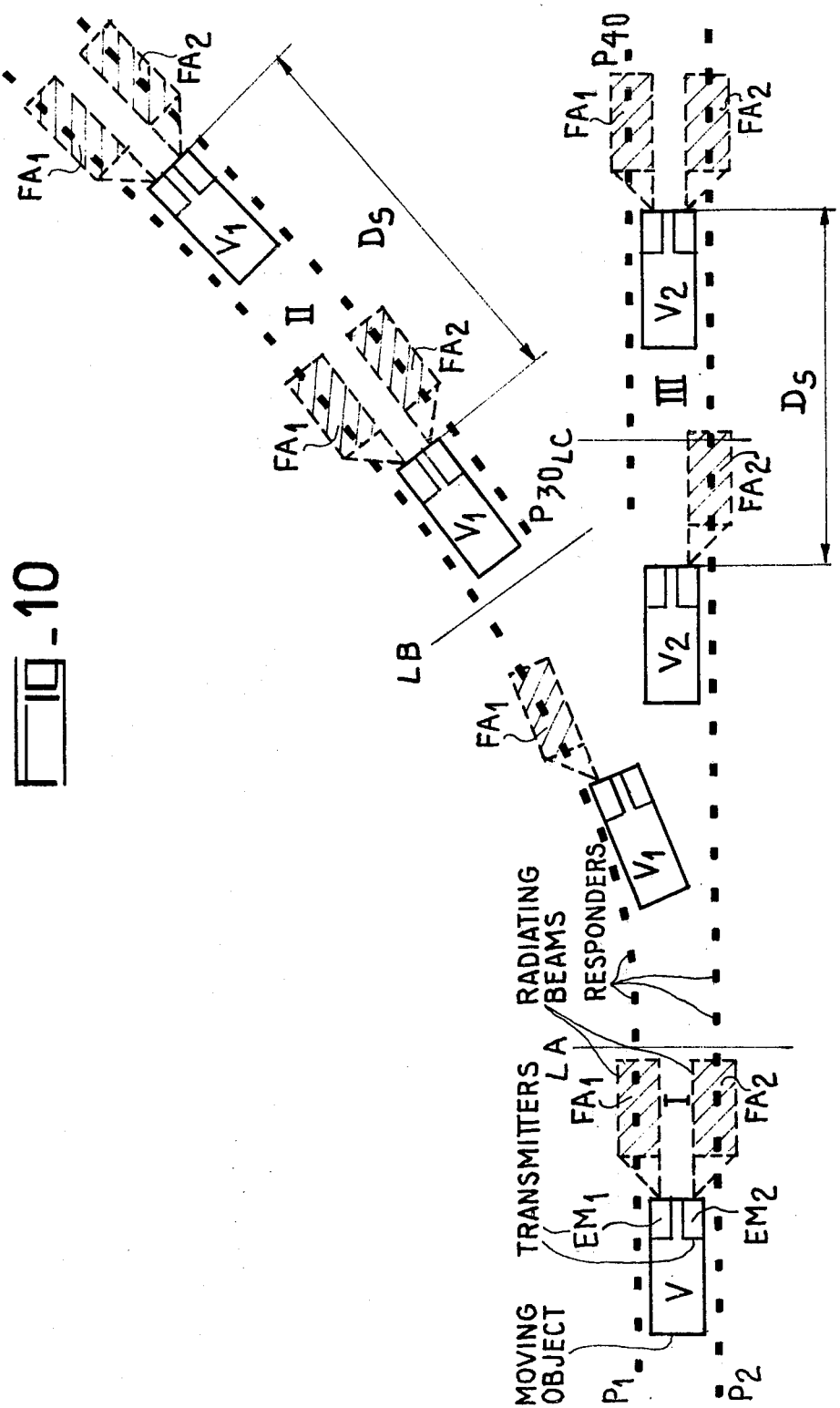
FIG. 10 is a diagram showing how a chosen direction can be taken with the aid of a system according to the invention.

As stated above, the system comprises a fixed part which is associated with the infra-structure of the route and a mobile part which is carried by vehicles using the system.

In FIG. 1, centerline XY represents the axis of a lane or roadway which the vehicle V should follow. On either side of this axis may be situated one or two rows of fixed responders of the reflector or catadioptric type, the spacing 1 between these responders may be selected for the optimum speed at which vehicles may move over the section of route equipped with the system. These responders, indicated in FIG. 1 by rows P1 to P10 and P2 to P20, delineate the road.

In this embodiment, where there are two rows of responders, the vehicle V carries two identical transmitter/receiver assemblies EM1 and EM2 which are situated at the front of the vehicle on either side of its axis and at a distance $d/2$ from this axis.

Each assembly, such as unit EM1, contains a transmitter formed by a laser or sub-laser emitter diode E1 with an associated lens OP1 which projects, forward and to one side, a beam FA1 which illuminates on the road a so-called useful area or zone of substantially rectangular shape whose length L is such that it covers a certain number (here 5) of reflectors P1-P10 or P2-P20. T-R unit EM1 also includes a receiver R1 in the form of a receiving diode whose optical field corresponds to the field ZU1 illuminated by the emitter. A semi-transparent sheet or mirror SM1 is inserted as a light shield between the emitter and receiver diodes.

The right-hand T-R unit EM2 contains the same components as unit EM1, with an emitter diode E2 and a receiver diode R2 separated by a semi-transparent sheet or mirror SM2. A beam FA2, similar to the beam FA1 emitted by the first unit is projected forward and sideways from the vehicle.

The way in which the system of FIG. 1 operates is as follows: diodes E1 and E2 emit light under steady-state conditions with an intensity distribution across the beams varying according to a Gaussian law as a function of the coordinate Z perpendicular to axis XY. FIG. 2 shows this distribution, curve S1 corresponding to the beam emitted by unit EM1 and curve S2 corresponding to the beam emitted by unit EM2.

The respective signals received by diodes R1 and R2 vary as a function of deviations of vehicle V from its assigned path. In FIG. 2 are shown certain positions A, B, C which the vehicle may occupy in relation to the centerline XY of the lane concerned. The amplitudes of the received signals which correspond to these positions are marked A1, B1, C1 and A2, B2, C2 on curves S1 and S2, respectively.

FIG. 3 shows how the amplitudes of curves S1 and S2 differ so that the points along the ordinate axis S which correspond to the points A, B, C, as plotted on the abscissa axis Z represent the magnitudes of the received signals for the different positions together with their sign. The differences in signal amplitudes at points A1 and A2, for example, thus represent the divergence between the position of the vehicle and the centerline of the lane along which the vehicle is traveling. These differences, which can be determined by any conventional comparison circuit, of one or the other polarity that may be used in a known manner to control the steering mechanism of the vehicle for the purpose of guiding it, a corresponding control device having been indicated schematically at STC in FIG. 5.

It will be seen that such a guidance system is highly reliable since it is able to operate satisfactorily even if the effective area of reflection becomes about equal to than, the area of one reflector in either of the zones ZU1, ZU2 of emitted radiation. This is an important point when for example the reflectors are obscured by snow, mud or dirt.

FIG. 4 is a diagram of a beam FA (representative of either beam FA1, FA2 of FIG. 1) emitted by a transmitter fitted to a vehicle. The beam is bounded to two planes forming a downwardly directed dihedral, these planes being intersected by the road surface so that the useful portion of the beam has the shape of an elongate rectangle with a major dimension of length L. At the same time its width is sufficient to illuminate the sides of the road, where vertical responders may be situated in a somewhat elevated position as illustrated in FIG. 9.

FIG. 5 shows another embodiment of a system according to the invention in which the vehicle has only one T-R unit which, cooperates with only a single row of reflective responders P1-P10 arranged on or along the traffic lane concerned.

The transmitter/receiver assembly of the vehicle shown in FIG. 5 is similar to that described for FIG. 1. However, the transmitter is here formed by two emitter diodes E11, E12 radiating two overlapping beams which are modulated by sine waves which are 180° out of phase. The diodes thus operate alternatively, projecting respective amplitudemodulated beams FA11, FA12 merging into a single beam FA1 which is subject to a cyclic translatory shift of amplitude D along the transverse axis Z perpendicular to axis XY. The sine waves used to modulate the diodes of the emitter are produced by a generator GF. It is understood that each sine wave energizes one diode.

FIG. 6 shows the Gaussian distribution of the intensity of the emitted composite beam, the variations in beam intensity imposing an amplitude modulation on the useful signals returned by the reflectors.

The range D of transverse translatory shift of the line of peak power of the composite beam FA1, due to the alternate generation of its constituent beams FA11 and FA12, is shown to be substantially greater than the width $e$ of the effective area of a reflector, with $D=Ke$ where $K > 1$, so that the modulation can be effectively detected in the reflections picked up aboard the vehicle. This being so, the shift of the beam does not create any objectionable background modulation due to reflection from the road.

The three waveforms $a\ b\ c$ in FIG. 7 show the variation in the strength of the modulated signals detected aboard the vehicle when the vehicle is in one of the aforementioned three positions A, B, C in relation to the centerline of its lane along which reflective responders in the form of studs may be set up. In this case positions A and C are symmetrical with respect to position B which lies exactly on the axis of reflectors P1 to P10, that axis being offset from the centerline XY by a distance greater than half the width of either beam FA11, FA12 as will be apparent from FIG. 5. It can thus be seen that these signals are in phase opposition i.e. relatively inverted in the symmetrical positions A and C. Furthermore, the frequency of the signals is the same as the frequency $F = 1/T$ of the translatory shift. On the other hand, in the central position B the frequency 2F of the signals is twice that of the translatory shift.

From FIG. 5 it can further be seen that the equipment carried by the vehicle includes, besides the emitter and receiver diodes, the oscillation generator GF which supplies a reference signal of frequency F and a demodulation circuit DE which receives that reference signal. By demodulating in circuit DE the signals supplied by the receiver of unit EM1, with the aid of the reference signal, the signal shown in FIG. 3 is again obtained. The signal so produced yields a voltage whose amplitude varies in accordance with the position of the vehicle along the axis Z transverse to the road. FIG. 3 shows this voltage, which supplies a deviation signal to the steering-control device SC for correcting the position of the vehicle and to keep it on the axis of the centerline of its lane. As will be apparent from the foregoing, demodulator D15 includes means for comparing the reflections received during alternate half-cycles of the sine wave illustrated in FIG. 6.

FIG. 8 shows another embodiment of the invention in which a single transmitter/receiver EM1 is used on the vehicle, this unit again coacting with a single row of studs P1 to P10. The transmitter includes, as in the embodiment in FIG. 5, two emitter diodes E11, E12 and one receiver diode; however, the emitter diodes operate continuously to produce two beams FA11, FA12 which are again relatively offset in the transverse direction and partially overlap. The signals are used in the same way as in the first embodiment where the difference between the reflections from responders illuminated by different beams is utilized. However, in order to let the comparison means in the processing equipment distinguish between the reflected signals from the two beams which are picked up by the receiver these signals differ from each other by some parameter such as their mode of other parameter, which may be their polarization or their wavelength.

In the embodiments shown in FIGS. 5 and 8 it was assumed that there was only one transmitter/receiver unit on the vehicle cooperating with only one row of responders. It is, however, possible to use on the vehicle two similar transmitter/receiver units which may be arranged on opposite sides of the longitudinal axis of the vehicle and which may each cooperate with one row of responders on the respective side of that axis. These additional units are shown in broken lines in the Figures. That duplication has the advantage of an increased safety factor inasmuch as a faulty unit is no longer a hazard since the other unit can continue to operate. Another advantage relates to a particular feature which will be described below, namely the choice of branches at a fork in the road.

It is possible to provide on the vehicle two extra receivers in addition to those provided in the case where the road has two rows of passive responders as shown in FIG. 1. However, in this case the optical field of each of the extra receivers R3, R4, which are associated with semi-transparent mirrors SM3, SM4, is shorter than the interval between two successive responders having a length $E < 1$. The zones of detection of receivers R3, R4 are marked ZR3, ZR4 in FIG. 1.

The result of this arrangement is that, when the vehicle moves longitudinally at a speed $v$, each of the diodes E11, E12 emits a succession of pulses of whose recurrence period T is equal to $l/v$. For a given vehicle speed $v$ it will be possible to vary the interval T between successive pulses by altering the spacing l between the studs. This relative variation of interval T may be looked upon as a coding which is fixed in relation to the ground and which may be used in particular for the purpose of regulating the speed of vehicles, with the aid of suitable means responsive to the pulse frequency, as indicated schematically at SPC in FIG. 1.

The respective positions of the various successive responders may also, for example, follow a binary code, this code supplying information concerning the position of the responders and possibly indicating such things as obstacles, entrances and exits on motorways, sharp bends, drainage gulleys etc. The receiver may then be programmed so that, when these indications are picked up and decoded by the on-board equipment, the steps to be taken are automatically indicated by a program, which may be fed in at the moment when the vehicle starts on its way along the road on which this information is picked up. A programmer PR has been indicated diagrammatically in FIG. 1.

FIG. 9 shows an installation of this kind where responders P1' providing coded information are arranged along the roadway, in the form of studs for example, while supplemental responders P2" at the side of the road are in the form of reflectors or catadiopters whose spacing gives the speed limit to be observed.

Special safety measures may be provided to ensure that the codes do not cause dangerous or erratic steps to be taken if certain studs are accidentally rendered ineffective or destroyed. This can be accomplished, in the manner known per se by the use of code redundancy, the indication of parity, or the transmission of an alarm signal in the event of repeated redundant codes.

Various applications may be envisaged within the context of the present invention, in particular when the system uses two rows of responders and the vehicle carries two transmitter/receiver units which are positioned symmetrically to the axis of the vehicle, as already mentioned.

FIG. 10 shows how a vehicle may be made to change direction while traveling along, in order to cause it to turn off into a road which branches from the road it is following.

A vehicle V, which may represent either a vehicle V1 veering to the left or a vehicle V2 moving straight ahead, carries two T-R units EM1 and EM2 which are symmetrical to the axis XY of the vehicle, i.e. to the centerline of the section of roadway concerned. These units emit two fields of radiation FA1, FA2 respectively sweeping a line of responders P1 and a line of responders P2 on opposite sides of that centerline. Line LA indicates the beginning of a left-hand turn-off from roadway I. Roadway I continues toward the right of the Figure to merge with a roadway III which begins at line LC whereas the turn-off merges with a roadway II which begins at line LB. Between lines LA, LB, LC a single row of responders delineates each of the roadways II,III continuing from roadway I.

Thus, if unit EM2 for example is deliberately turned off when line LA is reached, vehicle V (now V1) will automatically follow the route marked by row P1, whereas if unit EM1 is turned off at line LA, vehicle V (now V2) will follow row P2. When the point of decision defined by the area bounded by lines LA, LB, LC has been left behind, the T-R unit which was temporarily turned off may be switched on again, the two roadways being again delineated by two rows of responders which are designated P1, P30 in the case of roadway II and P2, P40 in the case of roadway III.

It will be seen that for this system, where there is no action of a mechanical nature to be taken, there is no restriction on traffic density.

Another advantage of the embodiments in which the vehicle carries two transmitter/receiver units associated with two rows of responders is that it allows vehicles traveling on different roads to cross each other's paths without encountering any guidance problem.

FIG. 11 is a schematic view of the way in which such an operation is arranged.

A vehicle V1, which carrier transmitter/receivers EM11 and EM12, is traveling along a roadway I equipped with two rows of responders P1 to P10 and P2 to P20, which are illuminated by beams FA1' and FA2' respectively.

A vehicle V2, carrying transmitter/receivers EM21 and EM22, is traveling along a roadway II equipped with two rows of responders P3 to P30 and P4 to P40, which are illuminated by beams FA1 and FA2" respectively.

At the point of intersection it is merely necessary for the responders to be laid out on the two roadways in such a way that the two sets cannot be illuminated simultaneously by one of the beams emitted by a vehicle, thus preventing any change of direction. This merely requires that the spacing l of the responders of any row be substantially greater than the beam width, as shown. Thus, my invention allows the guidance of a vehicle to continue where two roads equipped with reflective responders intersect. However, precautions would still have to be taken in the event of two vehicles arriving simultaneously at the point of intersection.

What is claimed is:

1. A system for the automatic guidance of a movable object traveling over a supporting surface along a predetermined path, comprising:
    transmitting means on said object for directing radiant energy forwardly and sideways toward said surface in the form of at least one pair of beams intersecting said surface in two substantially rectangular zones of illumination with substantially coextensive major dimensions in the direction of motion of said object, said zones being relatively offset transversely to said direction of motion and lying alongside a centerline of said path;

a series of spaced-apart responders disposed in at least one row parallel to said centerline and close to said surface for reflecting radiant energy of substantially equal intensity from both said beams toward said object as long as said object occupies a normal position athwart said centerline, said zones having a width exceeding that of said row and a length extending over a plurality of responders of said row;

receiving means on said object for separately detecting the reflections of said beams from said responders; and steering-control means on said object connected to said receiving means for correcting deviations from said centerline, said receiving means including comparison means for ascertaining differences indicative of said deviations between the intensities of said reflections.

2. A system as defined in claim 1 wherein said transmitting and receiving means include respective laser diodes.

3. A system as defined in claim 2, further comprising semitransparent shield means between said transmitting and receiving means.

4. A system as defined in claim 1 wherein said transmitting means comprises a pair of transmitters radiating toward opposite sides of said object for locating said zones on opposite sides of said centerline in said normal position, said responders being disposed in two rows symmetrically spaced from said centerline.

5. A system as defined in claim 1 wherein said path is one of two intersecting roadways provided with rows of responders for the guidance of respective objects traveling therealong, the width of said zones being less than the spacing of said responders in a row whereby an object passing the intersection on one roadway remains unaffected by the responders of the other roadway.

6. A system as defined in claim 1 wherein said receiving means includes a first receiver, with a field of detection extending over substantially the entire length of said zones for actuating said steering-control means in response to reflections from any of said plurality of responders, and a second receiver with a field of detection extending over a fraction of said length for picking up reflections from only one responder at a time, further comprising speed-control means connected to said second receiver for varying the velocity of said object in accordance with the spacing of said responders.

7. A system as defined in claim 6 wherein the responders coacting with said second receiver are disposed alongside said path at an elevation above said surface.

8. A system as defined in claim 1 wherein said transmitting means comprises a pair of transmitters radiating toward one side of said object for locating said zones in relatively offset relationship overlapping on said row in said normal position, said beams having characteristic parameters facilitating separate detection of their reflections by said receiving means.

9. A system as defined in claim 8 wherein said characteristic parameters are relatively inverted phases, said transmitting means including a sine-wave generator for modulating said beams in mutual phase opposition.

10. A system as defined in claim 8 wherein said characteristic parameters are different wavelengths.

11. A system as defined in claim 8 wherein said characteristic parameters are different modes of polarization.

12. A system as defined in claim 8 wherein said pair of transmitters are part of one of two substantially identical transmit-receive units disposed on opposite sides of said object for radiating respective pairs of relatively offset beams toward opposite sides of said centerline and detecting reflections thereof, the zones of illumination produced by said pairs of beams overlapping on respective rows of responders in said normal position.

13. A system as defined in claim 12 wherein said path splits into two diverging branches, each of said rows of responders continuing into one of said branches, the transmit-receive units on either side of said object being selectively deactivable for guiding said object exclusively by the row of responders on the opposite side onto a respective branch.

* * * * *